(12) United States Patent
Porter et al.

(10) Patent No.: US 7,615,504 B2
(45) Date of Patent: Nov. 10, 2009

(54) CEMENTITIOUS BOARDS

(75) Inventors: John Frederick Porter, St. Catharines (CA); Geraint Roberts, Youngstown, NY (US)

(73) Assignee: Saint-Gobain Technical Fabrics America, Inc., Northborough, MA (US)

( * ) Notice: Subject to any disclaimer, the term of this patent is extended or adjusted under 35 U.S.C. 154(b) by 0 days.

(21) Appl. No.: 12/034,772

(22) Filed: Feb. 21, 2008

(65) Prior Publication Data

US 2008/0200086 A1 Aug. 21, 2008

Related U.S. Application Data

(62) Division of application No. 10/615,671, filed on Jul. 9, 2003, now Pat. No. 7,354,876.

(51) Int. Cl.
*B32B 17/04* (2006.01)
*B32B 17/06* (2006.01)

(52) U.S. Cl. .......................... 442/180; 442/43; 442/58; 442/64; 442/65; 442/104; 156/148; 264/134; 264/136; 264/137

(58) Field of Classification Search .................. 442/43, 442/58, 104, 180, 64, 65; 156/148; 264/134, 264/136, 137
See application file for complete search history.

(56) References Cited

U.S. PATENT DOCUMENTS

| | | | |
|---|---|---|---|
| 4,460,633 A | 7/1984 | Kobayashi et al. | |
| 4,504,335 A | 3/1985 | Galer | |
| 4,535,015 A | 8/1985 | Bruner et al. | |
| 4,578,301 A | 3/1986 | Currie et al. | |
| 4,581,275 A | 4/1986 | Endo et al. | |
| 5,038,555 A | 8/1991 | Wu et al. | |
| 5,154,965 A | 10/1992 | Rouhling | |
| 5,792,713 A | 8/1998 | Scari et al. | |
| 6,054,205 A | 4/2000 | Newman et al. | |
| 6,391,131 B1 | 5/2002 | Newman et al. | |
| 6,579,413 B1 | 6/2003 | Grove | |
| 6,716,774 B2 | 4/2004 | Porter et al. | |
| 7,435,694 B2 | 10/2008 | Kajander | |
| 2002/0170648 A1 | 11/2002 | Dinkel | |
| 2002/0182953 A1 | 12/2002 | Porter | |
| 2002/0182954 A1 | 12/2002 | Porter | |
| 2003/0051430 A1 | 3/2003 | Grove | |
| 2004/0084127 A1 | 5/2004 | Porter | |
| 2004/0150139 A1 | 8/2004 | Gregg et al. | |
| 2004/0209060 A1 | 10/2004 | McGrady et al. | |
| 2004/0224584 A1 | 11/2004 | Broadway | |

FOREIGN PATENT DOCUMENTS

| | | |
|---|---|---|
| JP | 05147989 | 6/1993 |
| JP | 10018543 | 1/1998 |
| JP | 11348160 | 12/1999 |
| JP | 2002155450 | 5/2000 |
| JP | 2002088614 | 3/2002 |
| JP | 2002302877 | 10/2002 |

OTHER PUBLICATIONS

International Search Report in PCT/US04/21551 dated Dec. 29, 2004.

*Primary Examiner*—Andrew T Piziali
(74) *Attorney, Agent, or Firm*—Duane Morris LLP

(57) ABSTRACT

A cementitious board and methods of making the same are disclosed by a cementitious board including a cementitious core, a plurality of warp yarns and weft yarns and a coating applied to produce a coating weight distribution ratio of less than about 2.0:1, based upon the weight of the resinous coating of the weft yarns, over the weight of the resinous coating on the warp yarns.

15 Claims, 2 Drawing Sheets

CEMENTITIOUS BOARDS

CROSS-REFERENCE TO RELATED APPLICATION

Figure 1:
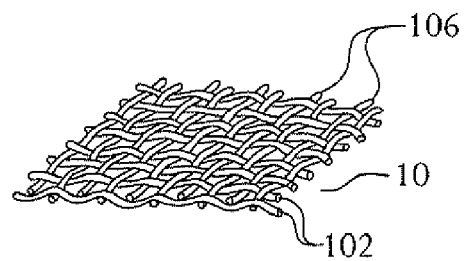

The present application is a divisional application of U.S. Ser. No. 10/615,671, filed Jul. 9, 2003 now U.S. Pat. 7,354,876 issued Apr. 8, 2008.

FIELD OF THE INVENTION

This invention relates to coated reinforcing fabrics, and more particularly to alkali-resistant fabric reinforcements for cementitious materials.

BACKGROUND OF THE INVENTION

Cementitious boards useful in the construction industry are known to contain inorganic, hydraulically setting material, such as Portland cement or gypsum. Hydraulic gypsum and cement, once set, have very little tensile strength and are usually reinforced with facing materials which improve the resistance to tensile and flexural loads. This has been the basis for using paper facing on conventional gypsum wall board and nonwoven glass fiber scrim in cement boards.

Glass fiber meshes have been popular as a facing sheet in cement boards because they can increase the dimensional stability in the presence of moisture and provide greater physical and mechanical properties. However, most glass fiber compositions, other than AR glass, degrade in the alkali environment of a cement core, so they must be coated with a protective finish.

Cementitious boards have been manufactured by casting a hydraulic cement mixture in the form of a thin, indefinitely long panel. See U.S. Pat. No. 4,504,335, which is hereby incorporated by reference. The hydraulic cement is usually a mortar containing a mixture of water and Portland cement sand, mineral or non-mineral aggregate, fly ash, accelerators, plasticizers, foaming agents and/or other additives. The mortar slurry is deposited onto a glass reinforcing network having a strippable paper sheet thereon, which is fed from a roll to pass over the forming table and under a continuous stream of mortar. The mortar is then distributed across the breadth of the carrier sheet, and the mortar-laden carrier sheet is towed through a slit defined by a supporting surface and a cylindrical mortar screeding roller mounted above the supporting surface so that its axis is transversely parallel to the supporting surface. The long network of reinforcing fibers is drawn against the roller and through the slit, rotating the roller counter to the direction of the travel of the carrier sheet, whereby the roller presses the network into the surface of the mortar and wipes mortar adhering to the roller into the interstices of the network. The network then tows the resulting broad, flat ribbon of mortar towards a cutter.

Similarly, British Patent Specification No. 772,581 teaches a production of reinforced plasterboard by a method which comprises spreading plaster on a first conveyor belt, dumping the plaster onto a plaster-soaked reinforcing mesh which is being transported by a second conveyor belt, and passing the plaster under a pressure roller to produce a ribbon of the required thickness. A second plaster-soaked mesh is dragged onto the upper surface of the ribbon as the mesh is fed under a third conveyor belt mounted above and in pressing relationship to the ribbon of plaster.

In still another process, as described in Lehnert et al., U.S. Pat. No. 4,647,496, a randomly oriented fibrous glass mat is fed onto a continuously moving belt onto which gypsum slurry is poured. The top surface of the gypsum ribbon thus formed is layered with a second randomly oriented glass mat which forms a sandwich with the gypsum core and the lower glass mat.

Woven knit and laid scrim fabrics may be coated either:

(a) before fabric-forming, as in single-end-coated fabrics;

(b) in-line (normally roller or dip coated) concurrently with formation such as in the case of laid scrim nonwoven meshes; or (c) off-line coated after formation (normally roller or dip coated), typically used with many woven fabrics. In the case of coating before fabric-forming, the cost of coating each strand individually, in an operation prior to weaving, may be prohibitive. In the cases of in-line or off-line coating operations, the coating levels of the MD and CD yarns are generally not independent.

When woven, knit or mesh-type (scrim) nonwoven fabrics are dip or roller coated with resinous materials for imparting strength, abrasion resistance, fire retardancy, pigmentation and other properties, absorbent multi-filament yarns or strands are often used to prepare the fabrics. When the input yarns are of significant twist (over 0.1 turns/inch), the twist affects the ratio of coating weight in the cross-machine direction (weft yarns) versus the coating weight in the machine direction (warp yarns). Generally, multi-filament yarn based fabrics collect less coating in the warp direction and more coating in the weft direction. This is due to the asymmetry of tensions in the two directions—the warp yarns normally have higher tension, which is necessary to pull the fabric through the coating, drying, winding processes. In this description a strand is a single bundle of filaments—either continuous filaments or staple filaments. A yarn is a strand with some integrity of the filaments in the bundle—typically achieved by twisting the strand. The wet pick-up or WPU of a strand or yarn is defined as the weight of liquid coating on a yarn or strand divided by the weight of the strand or yarn, expressed as a percentage. The WPU of a strand in a dipping or roll coating process is determined in part by the following relationship:

$$WPU_{actual} = WPU_{max} - K \times \text{tension} \times \text{twist frequency}$$

where K is a "wetting parameter", a constant, depending on the strand surface area, certain liquid properties of the coating and the filament properties. The tension is the load applied to the strand in an axial direction often expressed in Newtons or grams-force. The twist frequency is the rate at which the strand of filaments is twisted often expressed in turns per inch or turns per meter.

The weft or cross-machine direction strands of a substantially orthogonal (woven or laid scrim) fabric are normally under very low tension. The warp or machine direction strands or yarns are normally under higher tension to facilitate pulling the fabric through the coating process. In this case the coating weight distribution ratio $(WPU_{cd}/WPU_{md}) = f((WPU_{cd\ max} - K_{cd} \times \text{tension}_{cd} \times \text{twist frequency}_{cd})/(WPU_{md\ max} - K_{md} \times \text{tension}_{md} \times \text{twist frequency}_{cd})$. Assuming that the twist and wetting parameters of the yarns in the machine and cross-machine direction remain the same with respect to each other, the higher MD and lower CD tension associated with processing typical woven, knitted and laid-scrim fabrics results in more coating being applied to the CD or cross-machine direction. Typical weight distribution ratios $(WPU_{cd}/WPU_{md})$ are greater than 2.0:1 to about 3.0:1, and are usually 2.5:1.

A balanced coating weight distribution is desirable. It is easy to achieve in the case of single-end-coated (SEC) fabrics as each strand is independently and explicitly coated with a given level of coating. The coated strands are then combined into a fabric with the ratio of coating ($DPU_{cd}/DPU_{md}$) being established simply by selection of yarns containing the desired coating weights-often selected to be the same in MD and CD.

Unequal coating levels between the MD and CD yarns, normally found in dip coated fabrics, an "imbalanced coating weight distribution ratio", often leads to undesirable properties of reinforcements especially those which have been treated or coated for corrosion or fire resistance. In corrosive environments, such as cement-based matrices, heavier coating in the CD implies lower, possible inadequate coating protection on the MD. Both quantity and quality of coating in the MD suffers. The tensioned, twisted MD bundle does not allow coating to penetrate within the bundle. As a result substantial pockets of air remain in the MD bundle. The poor quantity and quality of coating on the MD strands leads to poor corrosion protection of said strands relative to that of the CD strands.

Accordingly, there remains a need for woven, knit or mesh-type non-woven ("scrim") fabrics which have a more uniform coating, as well as methods for producing a uniform coating on such fabrics for improving aesthetic qualities and for protecting these fabrics in environments which require corrosion and flame resistance, for example.

SUMMARY OF THE INVENTION

In accordance with a first preferred embodiment of the present invention, a fabric reinforcement useful in an alkaline matrix is provided. The fabric reinforcement includes a plurality of warp yarns having a first twist (turns/inch) and a plurality of weft yarns having a second twist which is greater than the first twist. The fabric further includes an alkali-resistant coating disposed over a substantial portion of the warp and weft yarns after they have been assembled or laid, so as to produce a "weight distribution ratio" of less than about 2.0:1, preferably less than about 1.5, and generally within the range of about 1.0:1.0 to about 1.9:1.0, based upon the weight of the resinous coating on the weft yarns over the weight of the resinous coating on the warp yarns. Alternatively, the weight of distribution ratio can intentionally be made imbalanced in novel ways, such as 1:20 to 1:1, where the warp yarns have more coating than is usually applied, or 3:1 to 5:1, where the weft yarns have substantially more coating than is usually applied to fabrics. Preferably, the resinous coating is the binder, such as in the case of a nonwoven scrim, or a finish, such as in the case of a woven or knit scrim. Such binders and finishes can be applied in 1, 2 or 3 or more layers or passes.

The present invention can, alternatively or cumulatively, employ yarn twist, yarn tension, hydrophilic or hydrophobic coatings, and unbalanced warp-weft constructions, to bring about a more uniform overall coating application to the knit, weave, braid or scrim fabrics. In the most preferred embodiments, the fabric warp/weft twist level ratio is adjusted between the warp and weft yarns to create directional absorption of the coating so that the "coating weight distribution ratio" changes, for example, such that it is more balanced. Ideally, the tension and/or twist in the machine or warp direction is lowered, and the tension or twist in the cross-machine or weft direction is increased, to increase coating absorption in the warp yarns while reducing or maintaining the coating absorption in the weft yarns. Most preferably the higher natural tension of the warp (MD) yarns are offset by reducing the twist level of the warp yarns such that the product of (MD tension×MD twist level) is kept at a low level to facilitate increases in penetration (quality) and coating weight (quantity) to approach that of the weft yarns. In practice this requires the warp yarns having a twist of about 0.0-0.5, and preferable about 0.0-0.3 turns/inch.

In another embodiment of this invention, a reinforced cementitious board is provided which includes a cementitious core, such as those including Portland cement or gypsum, and a reinforcing fabric disposed on at least one face of the cementitious core. The reinforcing fabric includes a plurality of warp yarns having a first twist (turns/inch) and a plurality of weft yarns having a second twist which is greater than the first twist. A resinous coating is applied to the fabric in a "coating weight distribution ratio" of less than about 2.0:1, based upon the weight of the resinous coating on the weft yarns, over the weight of the resinous coating on the warp yarns.

The weight distribution ratio of the present invention greatly improves upon the prior art for woven, laid or woven scrim-type, braided and knitted fabrics, which routinely have "coating distribution ratios" of about 2.5:1. This high ratio is caused by more of the coating soaking into the cross-machine direction yarns than in the machine direction yarns, due to the normal tension applied to such fabrics in the machine direction during production. With only a modest twist variance, this invention can improve coating uniformity to a ratio of about 1.5:1, and if substantially all of the twist is removed from the machine direction yarns, the coating can be uniformly applied in a weight ratio of about 1:1. It has been found that when the average yarn twist, which is typically about 0.7 turns/inch in the warp direction, and 0.7 turns/inch in the weft direction, is adjusted so that the warp yarns preferably have about 0.0-0.3 turns/inch and the weft yarns have about 0.5-1.3 turns/inch, a better balance in the coating is achieved. More preferably, when the twisting in the machine direction is essentially 0 turns/inch and the twisting in the cross-machine direction is about a normal 0.7 turns/inch, a very uniform coating can be achieved in an economical manner.

Applicants have further determined that the coated reinforcing fabric of this invention, when embedded into cement boards, can achieve years of alkali resistance when the twist in the weft yarns is about 0.5-1.3 turns/inch and the twist in the warp yarns is about 0-0.3 turns/inch, when compared to coated fabrics of the same areal weight having 0.7 turns/inch in both the warp and weft yarns, the latter fabric experiencing alkali degradation and failure within days of being embedded into a cementitious board. Dye staining tests using Applicants fabric manufacturing techniques have demonstrated excellent coating coverage on the warp yarns, while adequate coating coverage was retained on the weft yarns. In still further embodiments of this invention, the fabric can be selected from laid scrim, stitch bonding or warp knitting, plain weaving, twill or satin weaving, unidirectional weaving, knitting, and knitting constructions. The typical fabric thickness is about 5-22 mils, with a binder or finish loading of about 18-250 wt. %, based on the weight of the fibers. The warp yarns, weft yarns, or both, can include glass filaments totaling 33-400 tex, and are preferably coated by a PVC-based plastisol coating. In order to further assist directional coating, the warp yarns can be treated with a hydrophilic agent prior to water based coating, or a oleophilic agent, prior to PVC-plastisol coating, and the weft yarns can be treated with an oleophobic agent prior to PVC-plastisol coating or a hydrophobic agent prior to a water based coating, for example.

A BRIEF DESCRIPTION OF THE DRAWINGS

Figure 2:
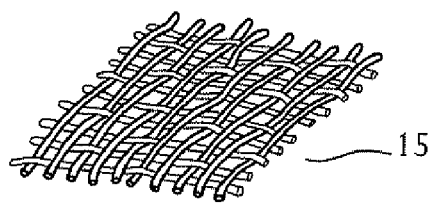
Figure 3:
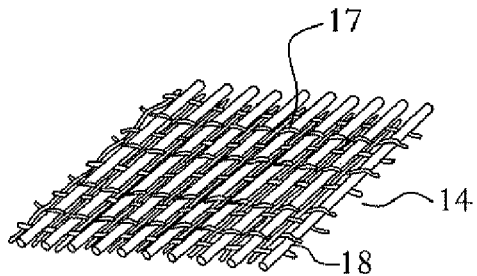
Figure 4:
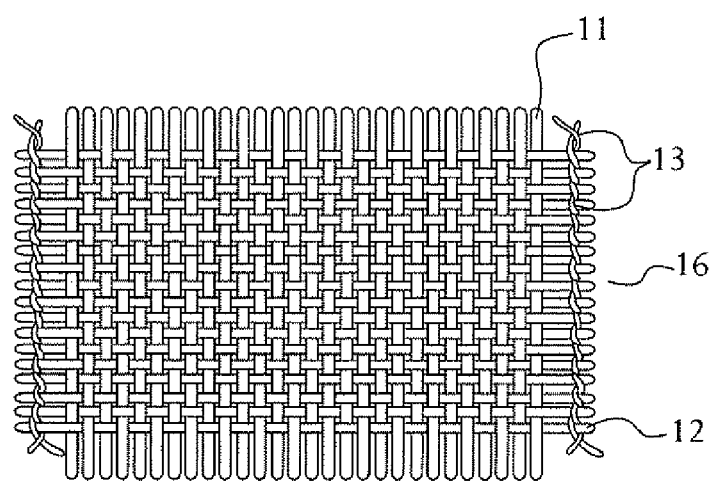
Figure 6:
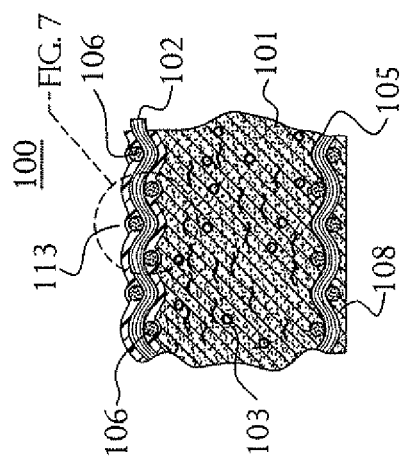
Figure 5:
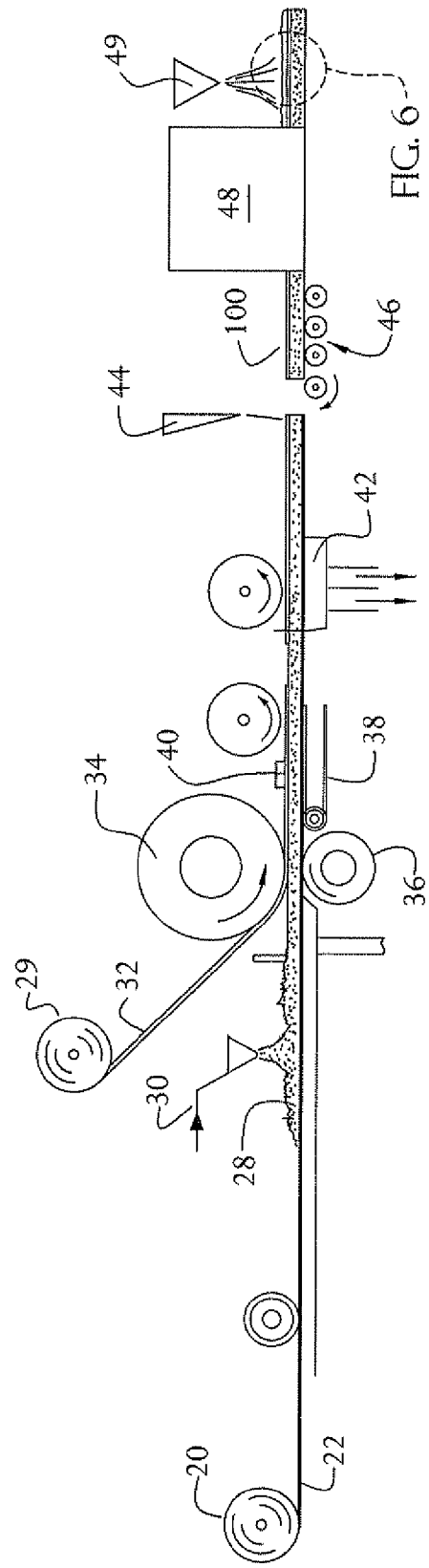

The present invention will be further described with reference to the following drawings:

FIG. 1: is a front perspective view of a preferred fabric of this invention employing an exemplary plain weave;

FIG. 2: is an alternative fabric of this invention depicting a five-harness satin weave;

FIG. 3: is a further embodiment of the fabric of this invention depicting a unidirectional weave;

FIG. 4: is a further embodiment of the fabric of this invention depicting a full-width plain weave with selvage;

FIG. 5: is a diagrammatic, side elevational view of a proposed continuous manufacturing line for producing cementitious boards using the fabric of this invention;

FIG. 6: is a magnified view of a cementitious board of FIG. 5; and

Figure 7:
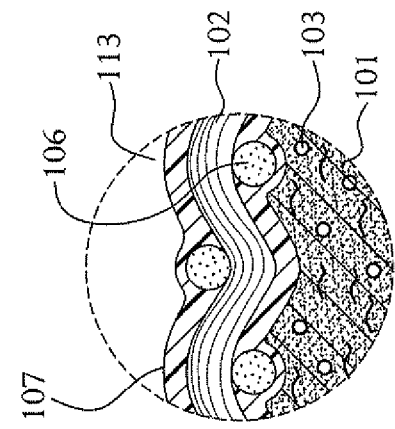

FIG. 7: is a magnified view of the top facing interface of FIG. 6.

DEFINED TERMS

In accordance with the present invention, the following definitions are used:

Areal weight. The weight of coated or uncoated fabric per unit area (width×length).

Cementitious material. An inorganic hydraulically setting material, such as those containing one or more of: Portland cement, mortar, plaster, gypsum, and/or other ingredients, such as, foaming agents, aggregate, glass fibers, moisture repellants and moisture resistant additives and fire retardants.

Composite facing material. Two or more layers of the same or different materials including two or more layers of fabrics, cloth, knits, mats, wovens, non-wovens and/or scrims, for example.

Fabric. Woven or non-woven flexible materials, such as tissues, cloth, knits, weaves, carded tissue, spun-bonded, point-bonded, and mesh-type scrim wovens and nonwovens, needled or braided materials.

Fiber. A general term used to refer to filamentary materials. Often, fiber is used synonymously with filament. It is generally accepted that a filament routinely has a finite length that is at least 100 times its diameter. In most cases, it is prepared by drawing from a molten bath, spinning, or by deposition on a substrate.

Filament. The smallest unit of a fibrous material. The basic units formed during drawing and spinning, which are gathered into strands of fiber for use in composites. Filaments usually are of extreme length and very small diameter. Some textile filaments can function as a yarn when they are of sufficient strength and flexibility.

Glass. An inorganic product of fusion that has cooled to a rigid condition without crystallizing. Glass is typically hard and relatively brittle, and has a conchoidal fracture.

Glass fiber. A fiber spun from an inorganic product of fusion that has cooled to a rigid condition without crystallizing.

Knitted fabrics. Fabrics produced by interlooping chains of filaments, roving or yarn.

Mat. A fibrous material consisting of randomly oriented chopped filaments, short fibers, or swirled continuous filaments held together with a binder.

Roving. A number of yarns, strands, tows, or ends collected into a parallel bundle with little or no twist.

Scrim. A low cost reinforcing fabric made from continuous filament yarn or strand in an open-mesh construction; can be woven or laid, for example.

Strand. One or more fibers or filaments in a group that is handled as an entity as an input in a textile process, e.g., a twisted roving or yard.

Tensile strength. The maximum load or force per unit cross-sectional area, within the gage length, of the specimen. The pulling stress required to break a given specimen. (See ASTM D579 and D3039)

Tex. Linear density (or gauge) of a fiber expressed in grams per 1000 meters.

Textile fibers. Fibers or filaments that can be processed into yarn or made into a fabric by interlacing in a variety of methods, including weaving, knitting and braiding.

Warp. The yarn, fiber or roving running lengthwise in a woven, knit or laid or woven scrim fabric. A group of yarns, fibers or roving in long lengths and approximately parallel.

Weave. The particular manner in which a fabric is formed by interlacing yarns, fibers or roving. Usually assigned a style number.

Weft. The transverse threads or fibers in a woven, knit or laid or woven scrim fabric. Those fibers running perpendicular to the warp. Also called fill, filling, yarn or woof.

Woven fabric. A material (usually a planar structure) constructed by interlacing yarns, fibers, roving or filaments, to form such fabric patterns as plain, harness satin, or leno weaves, for example.

Woven roving. A heavy glass fiber fabric made by weaving roving or yarn bundles.

Yarn. An assemblage of twisted filaments, fibers, or strands, either natural or manufactured, to form a continuous length that is suitable for use in weaving or interweaving into textile materials.

Zero-twist-yarn. A lightweight roving, i.e., a strand of near zero twist with linear densities and filament diameters typical of fiberglass yarn (but substantially without twist).

DETAILED DESCRIPTION OF THE INVENTION

Facing materials, cementitious boards and methods of manufacturing cementitious boards having the facing materials of this invention are provided. Facing materials which are embedded totally, or only partially, so as to present a fibrous facing, are within the scope of this invention. The fabric reinforcements of this invention can be employed in many end-use reinforcement applications, such as, for example, gypsum and cement boards, asphalt and road reinforcement, roofing applications, soil reinforcement, polymer-matrix reinforcement, and as stand-alone coated fabrics in filters, screens and garment applications.

With reference to the Figures, and particularly to FIGS. 1-4 thereof, there is depicted a series of fabrics useful as the facing layer of the preferred facing material of this invention. Needled, woven, knitted, braided and mesh-type nonwoven and composite materials are preferred because of their impressive strength-to-weight ratio and, in the case of wovens, braided, knits, and nonwoven mesh-types (also referred to as "scrim"), their ability to form weft and warp yarn patterns which can be manipulated to create directional absorption of coatings. While the facing layers of this invention can contain fibers and filaments of organic and inorganic materials, the most preferred fibers contain glass, olefin (such as polyethylene, polystyrene and polypropylene), Kevlar®, graphite, rayon, polyester, carbon, ceramic fibers, or combinations thereof, such as glass-polyester blends or Twintex® glass-olefin composite, available from St. Gobain Corporation, France. Of these types of fibers and filaments, glass compositions are the most desirable for their fire resistance, low cost and high mechanical strength properties.

Glass Composition

Although a number of glass compositions have been developed, only a few are used commercially to create continuous glass fibers. The five main glasses used are high alkali (alkali resistant or AR-glass) useful in motor or cement applications, such as in tile backing, electrical grade (E-glass), a modified E-glass that is chemically resistant (ECR-glass), a modestly chemically resistant glass (C-glass), and high strength (R or S-glass). A-glass is also available, but has limited uses. The representative chemical compositions of these five glasses are given in Table 1.

TABLE 1

Glass composition

| Glass type | Silica | Alumina | Calcium oxide | Li$_2$O | Magnesia | Boric oxide | Soda Na$_2$O + K$_2$O | Calcium fluoride | Zinc Oxide | Zirconium Oxide | Total minor oxides |
|---|---|---|---|---|---|---|---|---|---|---|---|
| E-glass | 52-56 | 12-16 | 16-25 | — | 0-6 | 5-13 | 0-.8 | 0-1 | — | — | 1 |
| A-glass | 72 | 1 | 8 | — | 4 | — | 14 | — | — | — | 1 |
| ECR-glass | 61 | 11 | 22 | — | 3 | — | 0.6 | — | — | — | 2.4 |
| S-glass | 64 | 25 | — | — | 10 | — | 0.3 | — | — | — | 0.7 |
| C-glass | 65-72 | 1-7 | 4-11 | — | 0-5 | 0-8 | 9-13 | — | 0-6 | — | — |
| AR-glass | 55-65 | — | — | .5-3 | — | — | 9-20 | — | — | 15-25 | 0.5 |

The inherent properties of the four glass fibers having these compositions are given in Table 2.

TABLE 2

Inherent properties of glass fibers

| | Specific gravity | Tensile strength MPa | Tensile strength Ksi | Tensile modulus GPa | Tensile modulus 10$^6$ psi | Coefficient of thermal expansion, 10$^{-6}$/K | Dielectric constant(a) | Liquidus temperature C.° | Liquidus temperature F.° |
|---|---|---|---|---|---|---|---|---|---|
| E-glass | 2.58 | 3450 | 500 | 72.5 | 10.5 | 5.0 | 6.3 | 1065 | 1950 |
| A-glass | 2.50 | 3040 | 440 | 69.0 | 10.0 | 8.6 | 6.9 | 996 | 1825 |
| ECR-glass | 2.62 | 3625 | 525 | 72.5 | 10.5 | 5.0 | 6.5 | 1204 | 2200 |
| S-glass | 2.48 | 4590 | 665 | 86.0 | 12.5 | 5.6 | 5.1 | 1454 | 2650 |

(a)At 20° C. (72° F.) and 1 MHZ. Source: Ref 4

Glass Melting and Forming

The conversion of molten glass in the forehearth into continuous glass fibers is basically an attenuation process. The molten glass flows through a platinum-rhodium alloy bushing with a large number of holes or tips (400 to 8000, in typical production). The bushing is heated electrically, and the heat is controlled very precisely to maintain a constant glass viscosity. The fibers are drawn down and cooled rapidly as they exit the bushing. A sizing is then applied to the surface of the fibers by passing them over an applicator that continually rotates through the sizing bath to maintain a thin film through which the glass filaments pass. After the sizing is applied, the filaments are gathered into a strand before approaching the take-up device. If smaller bundles of filaments (split strands) are required, multiple gathering devices (often called shoes) are used.

The attenuation rate, and therefore the final filament diameter, is controlled by the take-up device. Fiber diameter is also impacted by bushing temperature, glass viscosity, and the pressure head over the bushing. The most widely used take-up device is the forming winder, which employs a rotating collet and a traverse mechanism to distribute the strand in a random manner as the forming package grows in diameter. This facilitates strand removal from the package in subsequent processing steps, such as roving or chopping. The forming packages are dried and transferred to the specific fabrication area for conversion into the finished fiberglass roving, mat, chopped strand, or other product. In recent years, processes have been developed to produce finished roving or chopped products directly during forming, thus leading to the term direct draw roving or direct chopped strand.

Fabrication Process

Once the continuous glass fibers have been produced they must be converted into a suitable form for their intended application. The major finished forms are continuous roving, woven roving, fiberglass mat, chopped strand, and yarns for textile applications.

There are 2 types of fiberglass roving, assembled or multi-end roving and direct roving. Direct roving is made by producing multiple filaments of fiber and in the same process collecting them into a single strand. Assembled roving is made by, in a subsequent step, collecting 2 or more direct roving strands into a larger, loosely held strand. The process begins by placing a number of oven-dried forming packages into a creel. The ends are then gathered together under tension and collected on a precision roving winder that has constant traverse-to-winding ratio, called the waywind.

Direct rovings are used in many applications of this invention. Woven roving is produced by weaving fiberglass roving into a fabric form. This yields a coarse product that is used in continuous board manufacturing. The course surface is ideal for stucco and adhesive applications, such as EIF systems, since these material can bind to the coarse fibers easily. Plain or twill weaves are less rough, thereby being easier to handle without protective gloves, but will absorb stucco and adhesive. They also provide strength in both directions, while a unidirectionally stitched or knitted fabric provides strength primarily in one dimension. Many novel fabrics are currently available, including biaxial, double bias, and triaxial weaves for special applications.

The fabric 10 of the invention can be made in many constructions, such as those shown in FIGS. 1-6 (FIG. 5=laid scrim drawing; FIG. 6=stitchbonding or warp knitting) and can be made by conventional means such as plain weaving (FIG. 4), twill or satin weaving (FIGS. 1-2) or unidirectional weaving (FIG. 3) or knitting or stitchbonding (FIG. 6). Fine-fiber strands of yarn from the forming operation can be air dried on forming tubes to provide sufficient integrity to undergo a twisting operation. Twist provides additional integrity to yarn before it is subjected to the weaving process, a typical twist consisting of up to 0.7-1.0 turns/inch. In many instances heavier yarns are needed for the weaving operation. This is normally accomplished by twisting together two or more single strands, followed by a plying operation. Plying essentially involves retwisting the twisted strands in the opposite direction from the original twist. The two types of twist normally used are known as S and Z, which indicate the direction in which the twisting is done. Usually, two or more strands twisted together with an S twist are plied with a Z twist in order to give a balanced yarn. Thus, the yarn properties, such as strength, bundle diameter, and yield, can be manipulated by the twisting and plying operations. Fiberglass yarns are converted to fabric form by conventional weaving operations. Looms of various kinds are used in the industry, but the air jet loom is the most popular.

Zero twist-yarns may also be used. This input can offer the ease of spreading of (twistless) roving with the coverage of fine-filament yarns. The number of filaments per strand used directly affects the porosity and is related to yarn weight as follows: $n=(490\times Tex)/d^2$, where "d" is the individual filament diameter expressed in microns. Thus, if the roving with coarse filaments can be replaced with near zero twist yarn with filaments half the diameter, then the number of filaments increases by a factor of 4 at the same strand Tex.

The major characteristics of the knit or woven facing embodiments of this invention include its style or weave pattern, fabric count, and the construction of warp yarn and fill yarn. Together, these characteristics determine fabric properties such as drapability and performance in the final board. The fabric count identifies the number of warp and fill yarns per inch. Warp yarns run parallel to the machine direction, and fill yarns are perpendicular.

Woven, knit, braided or mesh-type (scrim) nonwoven fabrics can be coated with water-based resin, oil-based resin or 100% solid coatings to impart strength, provide corrosion or fire resistance, pigmentation and/or other properties. When the input yarns are of significant twist (over 0.1 turns/inch), this twist affects the ratio of coating weight in the weft or cross-machine direction versus the coating weight in the warp or machine direction ("coating weight distribution ratio"). Coating weight is often measured in the WPU % or DPU %, which are the ratios of wet or dry coating weight to yarn weight, respectively. For a typical plain weave fabric having multifilament weft and warp yarns or roving, a typical twist in both the warp and weft yarns is about 0.7 turns/inch. This creates a "coating weight distribution ratio" ($WPU_{cd}/WPU_{md}$) of about 2.5:1. The reason for this asymmetry in coating weight is that the tension in the machine direction, or warp yarns, is normally much higher than that in the cross-machine direction, or weft yarns, at the time of the coating operation. This is due to the normal tension necessary to pull the fabric through the continuous processing operations, which often include sequential coating, drying and winding steps. The tendency of a fabric to resist absorption of coating in the warp direction is roughly correlated to the following formula: $WPU_{md}=F(twist\ frequency \times tension \times wetting\ parameter)$.

The same relationship exists for the weft or cross-machine direction yarns, but since the cross-machine or weft yarns are normally under low tension, the yarns in this direction preferentially absorb or pick up more coating than the yarns in the warp direction. Thus, the ratio $WPU_{cd}/WPU_{md}$ reflects an imbalance, with more coating being applied to the weft, or cross-machine direction yarns.

This invention has realized the advantages of employing a greater degree of twist, a lower tension, or a higher wetting affinity in the weft yarns 102 than in the warp yarns 106 of fabric 10 of FIG. 1, so as to bring about a better uniformity of coatings. In the preferred embodiments of this invention, the weft yarns 102 have a twist of about 0.7-1.0 turns/inch, and the warp yarns 106 have a twist of only about 0-0.3 turns/inch. In the most preferred embodiments, the twist, hydrophilicity and/or tension are adjusted so that more coating is absorbed into the warp yarns 106 while maintaining or even reducing the amount of coating absorbed into the weft yarns 102. In the most preferred embodiments of this invention, the coating weight distribution ratio is less than about 2.0:1, and preferably, is less than about 1.5:1, with an ideal ratio being about 1:1, for example, if all twist is removed from the warp yarns 106.

Fabric Design

There are basically five weave patterns: plain, basket, twill, satin and leno. Plain weave is the simplest form, in which one warp yarn interlaces over and under one fill yarn. Basket weave has two or more warp yarns interlacing over and under two or more fill yarns. Twill weave has one or more warp yarns over at least two fill yarns. Satin weave (crowfoot) consists of one warp yarn interfacing over three and under one fill yarn, to give an irregular pattern in the fabric. The eight harness satin weave is a special case, in which one warp yarn interlaces over seven and under one fill yarn to give an irregular pattern. In fabricating a board, the satin weave gives the best conformity to complex contours, such as around corners, followed in descending order by twill, basket, and plain weaves.

Texturizing is a process in which the textile yarn is subjected to an air jet that impinges on its surface to make the yarn "fluffy". The air jet causes the surface filaments to break at random, giving the yarn a bulkier appearance. The extent to which this occurs can be controlled by the velocity of the air jet and the yarn feed rate. An equivalent effect can be produced by electrostatic or mechanical manipulation of the fibers, yarns or roving.

The fabric pattern, often called the construction, is an x, y coordinate system. The y-axis represents warp yarns and is the long axis of the fabric roll (typically 30 to 150 m, or 100 to 500 ft.). The x-axis is the fill direction, that is, the roll width (typically 910 to 3050 mm, or 36 to 120 in.). Basic fabrics are few in number, but combinations of different types and sizes of yarns with different warp/fill counts allow for hundreds of variations.

Basic fabric structures include those made by woven, non-woven and knit processes. In this invention, one preferred design is a knit structure in which both the x axis strands and the y axis strands are held together with a third strand or knitting yarn. This type of knitting is weft-inserted-warp knitting. If an unshifted tricot stitch is used, the s and y axis strands are the least compressed and, therefore, give the best coverage at a given areal weight. This structure's coverage can be further increased, i.e., further reduction in porosity, by using near-zero-twist-yarn or roving which, naturally, spreads more than tightly twisted yarn. This design can be further improved by assisting the spreading of filaments by mechanical (needling) means, or by high-speed air dispersion of the filaments before or after fabric formation.

The most common weave construction is the plain weave shown by the fabric 10 in FIG. 1. The essential construction requires only four weaving yarns: two warp yarns 106 and two fill or weft yarns 102. This basic unit is called the pattern repeat. Plain weave, which is the most highly interlaced, is therefore the tightest of the basic fabric designs and most resistant to in-plane shear movement. Basket weave, a variation of plain weave, has warp and fill yarns that are paired: two up and two down. The satin weave 15 represent a family of constructions with a minimum of interlacing. In these, the weft yarns periodically skip, or float, over several warp yarns, as shown in FIG. 2. The satin weave 15 repeat is x yarns long and the float length is x−1 yarns; that is, there is only one interlacing point per pattern repeat per yarn. The floating yarns that are not being woven into the fabric create considerable loose-ness or suppleness. The satin weave 15 produces a construction with low resistance to shear distortion and is thus easily molded (draped) over common compound curves. Satin weaves can be produced as standard four-, five-, or eight-harness forms. As the number of harnesses increases, so do the float lengths and the degree of looseness making the fabric more difficult to control during handling operations. Textile fabrics generally exhibit greater tensile strength in plain weaves, but greater tear strength in satin weaves. The ultimate mechanical properties are obtained from unidirectional-style fabric 14 (FIG. 3), where the carrier properties essentially vanish when attached to a set cementitious core 101. The higher the yarn interlacing (for a given-size yarn), the fewer the number of yarns that can be woven per unit length. The necessary separation between yarns reduces the number that can be packed together. This is the reason for the higher yarn count (yarns/in.) that is possible in unidirectional material and its better physical properties.

A plain weave 16 having glass weft 11 and warp 12 yarns or roving, in a weave construction is known as locking leno (FIG. 4), which is used only in special areas of the fabric, such as the selvage, and is woven on a shuttleless loom. The gripping action of the intertwining leno yarns anchors or locks the open selvage edges produced on rapier looms. The leno weave helps prevent selvage 13 unraveling during subsequent handling operations. However, it has found applications where a very open (but stable) weave is desired.

The design of fabric 10 suitable for this invention begins with only a few fabric parameters: type of fiber, type of yearn, weave style, yarn count, and areal weight.

When the preferred glass fibers are employed, a sizing is generally used. Preferred sizings for use with a fibrous layer comprised of glass filaments include aqueous sizings comprising one of the following blends: 1) an epoxy polymer, vinyl and amine coupling agents and a non-ionic surfactant; 2) an epoxy polymer, amine coupling agent and a non-ionic surfactant; 3) an epoxy polymer, metacrylic and epoxy coupling agents, and cationic and non-ionic surfactants (paraffin lubricants); 4) anhydrous polymerized acrylate amine (for example, the substance disclosed in PCT Patent Application No. WO 99/31025, which is incorporated herein by reference), metacrylic and epoxy coupling agents and a non-ionic surfactant; and 5) anhydrous polymerized epoxy amine (for example, as disclosed in U.S. Pat. No. 5,961,684 to Moireau et al., which is incorporated herein by reference), vinyl and amine coupling agents, and a non-ionic surfactant, each of the above blends being produced by Cem FIL Reinforcements of Saint Gobain Vetrotex Cem-FIL® S.L., a Saint Gobain Vetrotex company. Preferably, the non-ionic surfactant comprises an organo-silane. These sizings are compatible with the preferred coatings for the preferred fabric 10 and the cementitious core 101, and improve initial fiber strength and ease of fabric forming. The sizings preferably comprise not more than 2.5% by weight, and most preferably less than 1.5% by weight of the fibrous layer.

The following fabric styles and categories are useful in the practice of this invention:

| Fabric | Areal wt. grams/m$^2$ | oz/yd$^2$ |
|---|---|---|
| Light weight | 10-35 | 3-10 |
| Intermediate weight | 35-70 | 10-20 |
| Heavy weight | 59-300 | 15-90 |

| Fabric | Thickness μm | mil |
|---|---|---|
| Light weight | 25-125 | 1-5 |
| Intermediate weight | 125-250 | 5-10 |
| Heavy weight | 250-500 | 10-20 |

It has been determined that the fabric 10 desirably has an areal weight of about 15-300 grams/m$^2$, preferably about 30-150 grams/m$^2$, and thicknesses of about 5-22 mils are most preferred. The linear density of the preferred glass fibers preferably ranges from about 76 tex where yarns are employed, to 2,500 tex where rovings are employed. Where carbon fibers are used, they're preferably provided as tows, with the filament count preferably ranging from about 3,000 to 24,000. Preferred properties of glass fibers include a virgin filament tensile strength of at least about 185,000 psi or higher; Young's modulus of elasticity of about 10-12 million psi; strain at breaking point of at least about 1.5% or higher; water uptake at less than about 0.1%, and softening temperature of about 860° C. The preferred fabric 10 should also possess an ASTM D309 tensile strength of at least about 20 psi in the machine direction and about 5 psi in the cross-machine direction.

Combining fibers with very different properties can provide the fabric 10 with good longitudinal strength/stiffness values, as well as transverse (fill direction) toughness and impact resistance. The ability to hybridize the fabric 10 allows the board designer the freedom to build cementitious boards with different and perhaps conflicting requirements without major compromises. It is also possible to "teach" the looms new tricks, particularly in three-directional weaving, but interesting modifications are even possible for two-directional fabric. The loom has the capability of weaving an endless helix using different warp and fiber fill. Alternatively, a glass textile roving warp 17 and olefin weft 18, such as polyethylene or polystyrene fiber, can be used, as shown in FIG. 3. Alternatively, blends such as Twintex® glass-polyolefin blends produced by Saint-Gobain S.A., or individual multiple layers of polymers, elastomerics, rayon, polyester and glass filaments can be used as roving or yarn for the facing material, or as additional bonded or sewn layers of woven, knitted felt or non-woven layers.

A typical binder and/or finish loading for glass fibers is about 0.4 to about 2.0 (40-200 wt. %), but this invention anticipates using about 0.20 to about 2.5 (20-250 wt. %) binder and/or finish on the fabric 10 or reinforcement of this invention. The binder and/or finish preferably represent the resinous coating 107 of this invention, shown in FIG. 8, and can provide desirable properties, such as slurry penetration resistance, adherence to the core or other layers or materials, hydrophobic or hydrophilic properties, or a combination of these properties. In nonwoven scrim embodiments of this invention, the resinous coating 107 is typically a binder; in woven or knit scrim embodiments, the resinous coating 107 is typically a finish. The finish, binder and additional coating, if any, can be used separately or together, and can contain the same or different resinous compositions. Such binders and finishes can enable water vapor, slurry, or both, to pass through the facing during board manufacturing. These binders and or finishes may or may not completely coat the exterior facing fibers. In a more preferred embodiment, these binders and finishes should virtually completely encapsulate each strand or yarn unless good wetting and penetration allow protection of the large number of interior fibers independent of whether the exterior fibers of the bundle are also encapsulated. In this case some exposed fibers are acceptable to enable attachment. Some exposed fibers enable attachment to factory or field applied coatings or adhesives such as Portland cement based mortar, acrylic adhesive, silicone adhesive and glue on the outer surface of the cementitious board. The selected binders and finishes should also minimize "blocking" (adhesive bonding between adjacent boards during storage). Various binders and finishes are appropriate for this purpose, such as, for example, PVC-based plastisols, phenolic binders, ureaformaldehyde resin, or ureaformaldehyde resin modified with acrylic, styrene acrylic, with or without carboxylated polymers as part of the molecule, or as a separate additive. Additionally, these binders can be provided with additives, such as UV and mold inhibitors, fire retardants, etc. Carboxylated polymer additions to the binder resin can promote greater affinity to set gypsum, or to Portland cement-based mortars, for example, but are less subjected to blocking than resins without such additions. One particularly desirable binder resin composition is a 70 wt % ureaformaldehyde resin-30 wt % styrene acrylic latex or an acrylic latex mixture, with a carboxylated polymer addition.

The binders or finishes can be applied in 1, 2 or 3 layers or passes. The first application quality depends highly on tensions and twist level. If, after this coating is fused, a second coating (binder or finish) is applied, the tension and twist is a little less important as the strands are now acting as if they were monofilament yarns because they have a monolithic coating on them. Additional coatings are optional, and without them, the resulting porosity is generally very high. This is good as the reinforcement is generally buried just beneath the surface of the cement board. High porosity aids in this embedding. Subsequent coatings 107 to reduce porosity may not be necessary except in the case where a very smooth surface is required.

The fabrics 10 and/or reinforcements of this invention can be further coated prior to adhering these layers to a core 101 in order to further reduce porosity, to resist slurry penetration, reduce corrosion, improve strength or fire resistance, and/or to reduce the "fuzziness" of the surface, which can lead to some itching during repeated handling. The additional coating is distinguished from the sizing or binder used to bond the fibers together to form the individual layers, as described above, but can be the same or different composition. The additional coating 107 can include those described in U.S. Pat. No. 4,640,864, which is hereby incorporated by reference, and are preferably water-resistant and/or fire-retardant in nature. They are preferably applied during the manufacture of the fabric 10 of this invention, but may be applied by the board manufacturer prior to use in making cementitious boards.

The additional coating 107 applied to the fabric 10, as shown in FIGS. 6 and 7 of this invention, preferably coats of the warp strands 106 and weft strands 102 of fabric 10. Alternatively, the additional coating 107 can increase or decrease the wetting angle of the cementitious slurry to reduce penetration or increase adhesion. The coating 107 can further contain a UV stabilizer, mold retardant, alkali-resistant formulation, water repellant, a flame retardant and/or other optional ingredients, such as dispersants, catalysts, fillers and the like. Preferably, the coating 107 is in liquid form and the fabric 10 is led through the liquid, or the liquid is sprayed (with or without a water spray precursor) on one or both sides of the fabric 10 while the fabric is in tension.

Various methods of applying the additional coating 107 may be used, including dip-coaters, doctor blade devices, roll coaters and the like. One preferred method of treating the facing material with the additional coating 107 of this invention is to have a lower portion of one roll partially submerged in a trough of the liquid resinous composition and the fabric 10 pressed against the upper portion of the same roller so that an amount of the resinous composition is transferred to the fabric 10. The second roller above the first roller controls the movement of the fabric 10 and the uniformity of the amount of additional coating 107 disposed thereon. Thereafter, the coated fabric 10 is led in a preferred method to steam cans to expedite drying. It is preferred to pass the coated fabric 10 over steam cans at about 250-450° F. (100-200° C.) which drives the water off, if a latex is used, and additionally may cause some flow of the liquid resinous material to coat further and more uniformly fibers within the facer material. The additional coating 107 preferably covers about 50-80% of the surface area targeted, more preferably about 80-99% of said area.

The preferred additional coating of this invention can contain a resinous mixture containing one or more resins. The resin can contain solid particles or fibers which coalesce or melt to form a continuous or semi-continuous coating over and through the yarns. The coating can be applied in various thicknesses, such as for example, to sufficiently cover the fibrous constituents of the fabric 10 so that no fibers protrude from the added coating, or to such a degree that the fibers protrude from the added coating so that they can be used to join to additional layers in a EIF system or to mortar for tile, for example. The additional coating can form an alkali barrier which protects the fabric from alkaline cement cores, for example.

The additional coating can comprise a thermoplastic or a thermoset resin. Numerous commercially available resins which are effective in forming water- or weather-resistant coatings are available. The additional coating of fabric 10, for example, of this invention is optionally capable of forming a coating having a surface water absorption value of no greater than about 0.05 grams, as measured by a "Modified Cobb Test", in which a 5 inch$^2$ coated sample is contacted with a 4.5 inch diameter×1 inch high Cobb ring filled with water for 2 hours. In this embodiment, cementitious boards should also absorb less than 10 wt. %, preferably less than 5 wt. % water when tested in accordance with the immersion test of ASTM method C-473, when a water resistant core formulation is used.

The additional coating can be formed from a mixture of resin and fillers, such as silicates, silica, gypsum, titanium dioxide and calcium carbonate. The additional coating 107 can be applied in latex or curable thermosetting form. Acceptable resins include styrene-acrylic copolymer, acrylics, flame retardant acrylics or brominated monomer additions to acrylic, such as Pyropoly AC2001, poly(vinyl acetates), poly (vinyl alcohols), vinylidene chloride, siloxane, and polyvinylchloride such as Vycar® 578. In addition, fire retardants, such as bromated phosphorous complex, halogenated paraffin, colloidal antimony pentoxide, borax, unexpanded vermiculite, clay, colloidal silica and colloidal aluminum can be added to the resinous coating or saturant. Furthermore, water resistant additives can be added, such as paraffin, and combinations of paraffin and ammonium salt, fluorochemicals designed to impart alcohol and water repellency, such as FC-824 from 3M Co., organohydrogenpolysiloxanes, silicone oil, wax-asphalt emulsions and poly(vinyl alcohol) with or without a minor amount a minor amount of poly(vinyl acetate). The added coating can include pigment, such as kaolin clay, or lamp black thickeners such as modified bentonite clay, defoamers, such as fatty acid/polyglycol mixtures, UV resistance additives, setting accelerators, such as clay compounds, polyacrylamide, potassium salts, or combinations thereof, and dispersants such as sodium polyacrylate. Known preservatives and, of course, water can be added in latex compositions, and solvents in thermosetting compositions. (See, for example, U.S. Pat. No. 4,640,864, which includes insulation boards including polyvinylchloride based coatings including fire- and water-repellants, and which is hereby incorporated by reference). Other additives, suggested herein as being useful in the binder or cementitious core 101, could also be employed in the added coating.

The preferred fabric 10 and additional coating 107 can provide long term durability in the highly alkaline environment of a cementitious core 101 where the matrix is comprised of materials such as cement paste, mortar, gypsum, concrete and/or geopolymers. The fabric 10 may be comprised of glass fibers, PVA fibers, carbon fibers, olefin fibers or aramid fibers, for example, or any combination thereof. Most preferably, the fabric 10 contains glass fibers disposed in multifilament yarns. E-glass, AR-glass, A-glass, S-glass or ECR-glass is acceptable. AR-glass is desirable because it has a high degree of resistance to alkali attack and a higher strength retention over time. This is due to the presence of an optimum level of Zirconia ($ZrO_2$), e.g. preferably about 10% to about 25% $ZrO_2$, in the glass fibers. This type of glass exhibits a high degree of chemical resistance, resisting the very high alkalinity produced by the hydration of cementitious materials such as ordinary Portland cement. In addition, AR-glass has superior strengthening properties necessary for use in earthquake and explosion-resistant applications. It has high tensile strength and modulus and does not rust. Other glass fibers may be employed, such as E-glass, ECR-glass, C-glass, S-glass and A-glass, which are not inherently alkali-resistant, but are acceptable when coated with an alkali-resistant material, such as the disclosed polyvinyl chloride resinous coating.

The resinous coating 107 as shown in FIG. 7, is preferred where the fibrous layer is comprised of glass; however, coatings are not necessary where the fibrous layer is comprised of AR-glass, PVA, carbon or aramid fibers. The resinous coating 107 desirably provides mechanical and chemical protection to the glass fibrous layers 12. The resinous coating 107 is preferably an acrylate and/or vinyl chloride containing a polymer or polymers, such as acrylic or PVC plastisol, but may be poly-vinyl alcohol (PVA), styrene-butadiene rubber (SBR), polyolefin, acrylic acid, unsaturated polyesters, vinyl ester, epoxies, polyacrylates, polyurethanes, polyolefins, phenolics, and the like. Examples of preferred coatings include an acrylic coating manufactured by Saint-Gobain Technical Fabrics, a Saint-Gobain company, under the label number 534 and a PVC plastisol coating manufactured by Saint-Gobain Technical Fabrics under the label number V38. The use of PVC plastisol as a coating further improves the alkali resistance of the fibrous layer in the inorganic matrix. The use of acrylic as a coating promotes adherence of the fibrous layer to an inorganic matrix, especially where the matrix includes acrylic.

According to a preferred embodiment of the present invention, the binding, sizing, and/or coating of the fabric 10 are selected or combined to optimize tensile performance and retention of tensile strength after aging, and to improve compatibility between the fibers, sizing, coating and cementitious matrix. For example, the resinous coating 107 could be a sizing having an adherent coating thereon, in which the added cementitious core 101 is adherent to the added coating. A preferred combination includes a sizing selected from the group consisting of 1) an epoxy polymer, vinyl and amine coupling agents and a non-ionic surfactant; 2) an epoxy polymer, amine coupling agent and a non-ionic surfactant; 3) an epoxy polymer, metacrylic and epoxy coupling agents, and cationic and non-ionic surfactants (paraffin lubricants); 4) anhydrous polymerized acrylate amine, metacrylic and epoxy coupling agents and a non-ionic surfactant; and 5) anhydrous polymerized epoxy amine, vinyl and amine coupling agents, and a non-ionic surfactant, and a polymeric coating selected from the group consisting of acrylic and PVC plastisol.

Board Manufacturing

With reference to FIG. 5, a preferred method of continuously manufacturing cementitious boards is described.

While it is preferred that slightly-modified, conventional wallboard or cement board manufacturing equipment be employed for producing the cementitious boards 100 of this invention, cementitious boards 100 can be manufactured in any number of ways, including molding, extrusion, and semi-continuous processes employing rollers and segments of the fabric 10 of this invention. As shown in FIG. 6, the fabric 10 can be in the form of a facing 105 which can be embedded in the cementitious core 101, such as to present a thin cementitious film 108 on the face of the board 100. Facing 113 can be embedded, or alternatively, be adhesively or mechanically bonded to the core 101 such as by the set core 101, itself, as shown in FIG. 6.

With further reference to FIG. 6, which is a blown up segment of the coated board shown in FIG. 5, the detail of a preferred a cementitious board 100 is provided. The cementitious board 100 includes a set cementitious core 101, made of set gypsum or Portland cement, for example. The cementitious core 101 preferably comprises a cementitious material, such as cement paste, mortar or concrete, and/or other types of materials such as gypsum and geopolymers (inorganic resins). More preferably the inorganic matrix comprises Portland cement having chopped fibers dispersed throughout the cement. Preferably the fibers are AR-glass fibers but may also include, for example, other types of glass fibers, aramids, polyolefins, carbon, graphite, polyester, PVA, polypropylene, natural fibers, cellulosic fibers, rayon, straw, paper and hybrids thereof. The inorganic matrix may include other ingredients or additives such as fly ash, latex, slag and metakaolin, resins, such as acrylics, polyvinyl acetate, or the like, ceramics, including silicon oxide, titanium oxide, and silicon nitrite, setting accelerators, water and/or fire resistant additives, such as silioxane, borax, fillers, setting retardants, dispersing agents, dyes and colorants, light stabilizers and heat stabilizers, shrinkage reducing admixtures, air entraining agents, setting accelerators, foaming agents, or combinations thereof, for example. In a preferred embodiment, the inorganic matrix includes a resin that may form an adhesive bond with a resinous coating applied to the alkali-resistant open fibrous layer. Preferably the cementitious core 101 has good bonding with the facings 105 and 113 which contain fabric 10, but also may be composite materials, including additional mats, or scrim of fabrics, for example. The cementitious core 101 may contain curing agents or other additives such as coloring agents, light stabilizers and heat stabilizers, for example.

Examples of materials which have been reported as being effective for improving the water-resistant properties of cementitious products either as a binder, finish or added coating, or performance additive 103 are the following: poly(vinyl alcohol), with or without a minor amount of poly(vinyl acetate); metallic resinates; wax or asphalt or mixtures thereof; a mixture of wax and/or asphalt and also corn-flower and potassium permanganate; water insoluble thermoplastic organic materials such as petroleum and natural asphalt, coal tar, and thermoplastic synthetic resins such as poly(vinyl acetate), polyvinylchloride and a copolymer of vinyl acetate and vinyl chloride and acrylic resins; a mixture of metal rosin soap, a water soluble alkaline earth metal salt, and residual fuel oil; a mixture of petroleum wax in the form of an emulsion and either residual fuel oil, pine tar or coal tar; a mixture comprising residual fuel oil and rosin, aromatic isocyanates and disocyanates; organohydrogenpolysiloxanes and other silicones, acrylics, and a wax-asphalt emulsion with or without such materials as potassium sulfate, alkali and alkaline earth eliminates. Performance additives 103 can be introduced directly into the cementitious slurry 28. The added coating can be applied to the fabric 10 before and/or after joining to the cementitious core 101.

If gypsum is employed, the core may be formed by mixing water with powdered anhydrous calcium sulfate or calcium sulfate hemidrate ($Ca-SO_4\cdot\frac{1}{2}H_2O$), also known as calcined gypsum, and thereafter allowing the mixture to hydrate or set into calcium sulfate dihydrate ($CaSO_4\cdot 2H_2O$), a relatively hard material. The cementitious core 101 of the support member will in general comprise at least about 85 wt. % set gypsum or cement.

The surface of the cementitious core 101 is faced with one or more layers of the fabric 10. The fabric 10 should be at least sufficiently porous to permit water in the aqueous slurry from which the core is made to evaporate therethrough, and may be porous enough to permit the slurry to pass through and form a continuous or discontinuous film 108. As described in the detail below, the cementitious board 100 in the present invention can be made efficiently by forming an aqueous slurry which contains excess water and placing thereon the facing material. Aided by heating, excess water evaporates through the preferred upper and lower glass fabric facings 105 or 22 and 116 or 32 as the cementitious slurry 28 sets.

Continuous Manufacturing Method

An attractive feature of the present invention is that the cementitious board 100 can be made utilizing existing wallboard or cement board manufacturing lines, for example, as shown somewhat diagrammatically in FIG. 5. In conventional fashion, dry ingredients (not shown) from which the cementitious core 101 is formed are premixed and then fed to a mixer of the type commonly referred to as a pin mixer 30. Water and other liquid constituents (not shown) used in making the core are metered into the pin mixer 30 where they are combined with the dry ingredients to form an aqueous cementitious slurry 28. Foam is generally added to the slurry in the pin mixer 30 to control the density of the resulting cementitious core 101.

As is common practice in the manufacture of conventional paper-faced gypsum board, the two opposite edge portions of the bottom glass fabric 22 or 105 are progressively flexed upwardly from the mean plane of the bottom glass fabric 22 or 105 and then turned inwardly at the margins so as to provide coverings for the edges of the resulting board 100.

A sheet of top glass fabric 32 or 116 is fed from the top glass fabric roll 29 onto the top of the cementitious slurry 28, thereby sandwiching the slurry between the two moving fabrics which form the facings of the cementitious core 101 which is formed from the cementitious slurry 28. The bottom and top glass fabrics 22 (or 105) and 32 (or 116), with the cementitious slurry 28 sandwiched therebetween enter the nip between the upper and lower forming or shaping rolls 34 and 36 and are thereafter received on a conveyer belt 38. Conventional wallboard edge guiding devices 40 shape and maintain the edges of the composite until the slurry has set sufficiently to retain its shape. Water of convenience, or excess water, can be drained with the assistance of vacuum boxes 42 disposed below the conveyor belt 38. In due course, sequential lengths of the board are cut by a water knife 44. The cementitious board 100 is next moved along feeder rolls 46 to permit it to set. It is further processed by exposure to heat in a drying oven 48 which accelerates the drying of the board by increasing the rate of evaporation of excess water. An additional sprayer 49 can be provided to add further treatments, such as silicone oil, additional coating, or fire retardants, to the board's exterior. The manufacturing techniques described in the "Background" section are also acceptable.

The fabric 10 and cementitious boards 100 of this invention are useful in all sorts of building construction applications. They are strong, having a screw strength of at least about 20 lbs., for gypsum cores of conventional densities and compositions. Some examples include shaft wall assemblies for elevators and stairways, fire doors and fire walls, roofing and siding substrates, with or without insulation, and tile backer boards. Some of the most desirable and useful applications for this invention are in EIF systems (also called EIFS, for Exterior Insulation Finishing Systems), or as tile backer boards.

From the foregoing, it can be realized that this invention provides improved coating techniques for fabrics and reinforcements, and specifically enables a more uniform coating to be applied to the warp and weft yarns of a knitted, braided, nonwoven mesh-type, or woven fabric. More uniform coatings enable composites, especially those containing cementitious cores, to last longer, achieve better aesthetics, strength and corrosion resistance. The more uniform coatings applied to the reinforcements of this invention can achieve better color uniformity in polymer composites, for example, and better uniform bonding between glass facings and cement or gypsum cores of boards, as well as better surface finish in cement boards. When alkali-resistant coatings are used, the more uniform weight distribution of the disclosed coatings permits the boards to achieve greater service life. This can be extended to matrices which must be resistant to fire, rain water and/or salt air. A more uniform coating can also assist the disclosed reinforcements to bond more adherently to a polymer or cementitious matrix and to other yarns having a similar coating in the fabric, as well as assist in bonding to externally applied adhesives, mortars, or the like. Although various embodiments have been illustrated, this is for the purpose of describing, but not limiting, the invention. Various modifications, which will be apparent to one skilled in the art, are within the scope of this invention described in the attached claims.

What is claimed is:
1. A reinforced cementitious board comprising:
  (a) a cementitious core; and
  (b) a reinforcing fabric disposed on at least one face of said cementitious core while imbedded into a portion of the cementitious core; said reinforcing fabric including:
    (i) a plurality of warp yarns having a first twist (turns/inch);
    (ii) a plurality of weft yarns having a second twist which is greater than said first twist; and

(c) a resinous coating applied to said reinforcing fabric in a coating weight distribution ratio of less than about 2.0:1 based upon the weight of the resinous coating on the weft yarns, over the weight of the resin on the warp yarns.

2. The cementitious board of claim 1 wherein said cementitious core comprises Portland cement.

3. The cementitious board of claim 1 wherein said reinforcing fabric comprises a woven, braided, nonwoven mesh-type or knitted fabric.

4. The cementitious board of claim 1 wherein said first twist of said warp yarns is about 0-0.3 turns/inch.

5. The cementitious board of claim 4 wherein said second twist of said weft yarns is about 0.7-1.0 turns/inch.

6. The cementitious board of claim 1 wherein said resinous coating comprises an alkali-resistant resin.

7. A reinforced cementitious board comprising:
   (a) a cementitious core comprising Portland cement; and
   (b) a reinforcing fabric disposed around and embedded into a portion of said cementitious core; said reinforcing fabric being composed of a multifilament yarn-based woven, braided, nonwoven mesh-type, or knitted fabric which includes:
      (i) a plurality of warp yarns having a first twist (turns/inch);
      (ii) a plurality of weft yarns having a second twist, said second twist being greater than said first twist; and
   (c) an alkali resistant resinous coating applied to said plurality of warp and said plurality of weft yarns after they have been assembled or laid together, such as to produce a coating weight distribution ratio of less than about 2.0:1 based upon the weight of the resinous coating on the weft yarns over the weight of the resinous coating on the warp yarns.

8. The cementitious board of claim 7 wherein said reinforcing fabric comprises sized glass fibers.

9. The cementitious board of claim 7 wherein said warp yarns have a twist of about 0-0.3 turns/inch.

10. The cementitious board of claim 9 wherein said weft yarns have a twist of about 0.7-1 turns/inch.

11. The cementitious board of claim 7 wherein said alkali resistant coating provides alkali resistance to said reinforcing fabric in a Portland cement board.

12. The cementitious board of claim 11 wherein said resinous coating comprises a pvc matrix having an oil phase distributed therein.

13. The reinforced cement board of claim 7, wherein the reinforcing fabric is disposed on at least one face of the cementitious core.

14. A method of making the cementitious board of claim 1, comprising:
   (a) providing a cementitious slurry;
   (b) depositing said cementitious slurry onto a moving reinforcing fabric, said reinforcing fabric comprising a plurality of warp yarns having a first twist (turns/inch), a plurality of weft yarns having a second twist which is greater than said first twist; and a resinous coating applied to said reinforcing fabric in a coating weight distribution ratio of less than about 2.0:1, based upon the weight of the resinous coating on the weft yarns, over the weight of the resinous coating on the warp yarns;
   (c) shaping said cementitious slurry and said reinforcing fabric into a board, whereby said reinforcing fabric is disposed on at least one face thereof, and
   (d) permitting said cementitious slurry to set.

15. The method of claim 14 wherein said step of shaping said cementitious slurry and said reinforcing fabric into a board is continuous or discontinuous.

* * * * *